(12) United States Patent
Becker

(10) Patent No.: US 7,743,694 B2
(45) Date of Patent: Jun. 29, 2010

(54) AXIAL PISTON MACHINE

(75) Inventor: Uwe Becker, Butzbach (DE)

(73) Assignee: Lik Fahrzeug-Hydraulik GmbH & Co. KG, Bad Homburg (DE)

( * ) Notice: Subject to any disclaimer, the term of this patent is extended or adjusted under 35 U.S.C. 154(b) by 385 days.

(21) Appl. No.: 11/791,202

(22) PCT Filed: Nov. 9, 2005

(86) PCT No.: PCT/DE2005/002022
§ 371 (c)(1),
(2), (4) Date: May 21, 2007

(87) PCT Pub. No.: WO2006/053526
PCT Pub. Date: May 26, 2006

(65) Prior Publication Data
US 2008/0031745 A1 Feb. 7, 2008

(30) Foreign Application Priority Data
Nov. 20, 2004 (DE) ................ 10 2004 056 081

(51) Int. Cl.
*F01B 3/00* (2006.01)
(52) U.S. Cl. ........................................ 92/71; 384/620
(58) Field of Classification Search ............... 92/71; 384/620
See application file for complete search history.

(56) References Cited

FOREIGN PATENT DOCUMENTS

| DE | 846 010 | 8/1952 |
|---|---|---|
| DE | 12 54 915 | 11/1967 |
| DE | 19 09 958 | 9/1970 |
| EP | 0 326 043 | 8/1989 |
| EP | 1 281 866 | 2/2003 |
| JP | 2000-018156 | 1/2000 |

*Primary Examiner*—F. Daniel Lopez
(74) *Attorney, Agent, or Firm*—Davidson, Davidson & Kappel, LLC

(57) ABSTRACT

An axial piston machine, in particular to an air-conditioning compressor for motor vehicles, including a drive unit for taking-in and compressing a pressure medium The drive unit is rotatably driven by a shaft, the rotatable movement of the shaft is convertible into the reciprocating motion of the pistons in the drive unit and the shaft is mounted in the casing of the axial piston machine, in particular by an axial bearing.

7 Claims, 3 Drawing Sheets

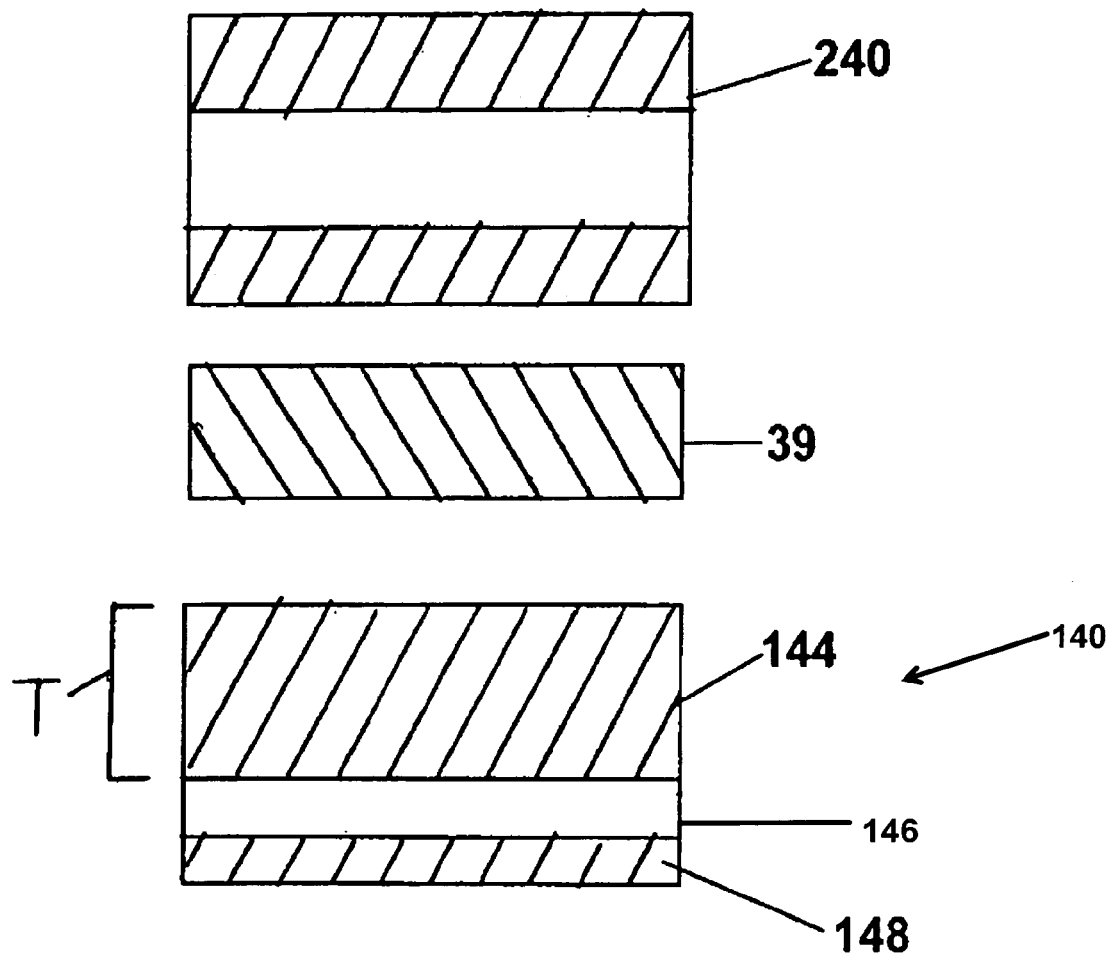

AXIAL PISTON MACHINE

The present invention relates to an axial piston machine, in particular an air-conditioning compressor for motor vehicles, having a drive mechanism for drawing in and compressing a pressurizing agent, the drive mechanism being rotary driven by a shaft and the rotary motion being converted in the drive mechanism to a reciprocating motion of the pistons, and the shaft being supported in part by an axial bearing in a casing part of the axial piston machine.

BACKGROUND

Such machines are known. The axial forces that occur are supported on the casing through the axial bearing. As a result, pulsations and vibrations are transmitted into the casing through this bearing point, and can then be heard from outside.

SUMMARY OF THE INVENTION

An object of the present invention is to present an axial piston machine that does not have these disadvantages.

The present invention provides an axial piston machine, in particular an air-conditioning compressor for motor vehicles, having a drive mechanism for drawing in and compressing a pressurizing agent, the drive mechanism being rotary driven by a shaft and the rotary motion being converted in the drive mechanism to a reciprocating motion of the pistons, and the shaft being supported in part by an axial bearing in a casing part of the axial piston machine, there being according to the present invention a rubberized metal sheet situated between the axial bearing and the contact face of the bearing in the casing as a damping element.

The use of a rubberized metal sheet (a metal sheet as a substrate, covered on both sides with a coating of rubber) has the advantage of very flat construction on the one hand and of with-standing high surface pressures continuously on the other hand. A pure elastomer element as a damping element does not withstand the continuous strain from the constantly changing rotating axial forces. The elastic damping of the rubberized metal sheet reduces the external noise of the compressor significantly.

Also preferred is an axial piston machine in which a device for articulated (pivoting/rocking) bearing support between shaft and axial bearing is situated between the axial bearing and the contact face of the shaft on the axial bearing. Preferred in addition is an axial piston machine in which the device has a first washer having an axially projecting conical rim and a second washer, which represents a bearing washer of the axial bearing, having a conically beveled edge on the outer circumference, the axially projecting conical rim of the first washer bearing on the conically beveled edge of the second washer in such a way that contact between the first and the second washers occurs only between the two cones, and otherwise an axial intermediate space is formed between the first and second washers. This has the advantage that the cone fulfills the function of a spherical segment surface in simplified form, without high demands on the precision of fabrication. When there is rotating radial flexing of the shaft, the first washer may undergo an angular displacement against the second washer due to a tipping motion, and the axial forces may be transmitted from the shaft to the bearing essentially flatly (all around) via the contact surfaces between the cones (possibly also spherical segments or domed surfaces), despite the angular position. In contrast to a non-articulated axial bearing, which would have a rotating point contact, here a nearly circular ring-shaped pressure line is obtained, which also contributes to more uniform loading of the damping element. Thus the service life of this type of damping device is increased further by this flat transmission of force.

Also preferred is an axial piston machine in which the conical angle is in the range of 30 degrees to 60 degrees, preferably 45 degrees.

A pump according to the present invention may have an elastomer-coated metal washer, in particular a rubberized metal sheet, used as the damping element. That has the advantage that the construction of the damping element is very flat, and that high surface pressure is made possible by the metal, since the elastomer coating cannot flow away under pressure, as in the case of a pure elastomer element. That makes it possible to achieve a long service life of the damping element. Furthermore, a rubberized metal sheet washer has a multiple damping effect, since the transition from the metal bearing to the first layer of rubber and from the first layer of rubber to the metal sheet and from the metal sheet to the second layer of rubber and from the second layer of rubber again to a part of the bearing permits five impedance jumps, and hence a corresponding suppression of vibration.

Therefore an axial piston machine is preferred in which the rubber-coated metal sheet is preferably coated on both sides. An axial piston machine is also preferred in which a plurality of rubberized metal sheet washers are situated one above the other in a so-called sandwich construction. Also preferred is an axial piston machine in which the rubberized metal sheet or sheets have rubber coatings or elastomer coatings of different thicknesses. This has the advantage that different frequencies may be damped by damping elements of differing thicknesses, making it possible for the damping elements to be targeted at the disturbing frequencies.

BRIEF DECRIPTION OF THE DRAWING

The present invention will now be described on the basis of the figures without being limited thereto.

FIG. 3 shows the sandwich construction of the damping element.

DETAILED DESCRIPTION

Figure 1:
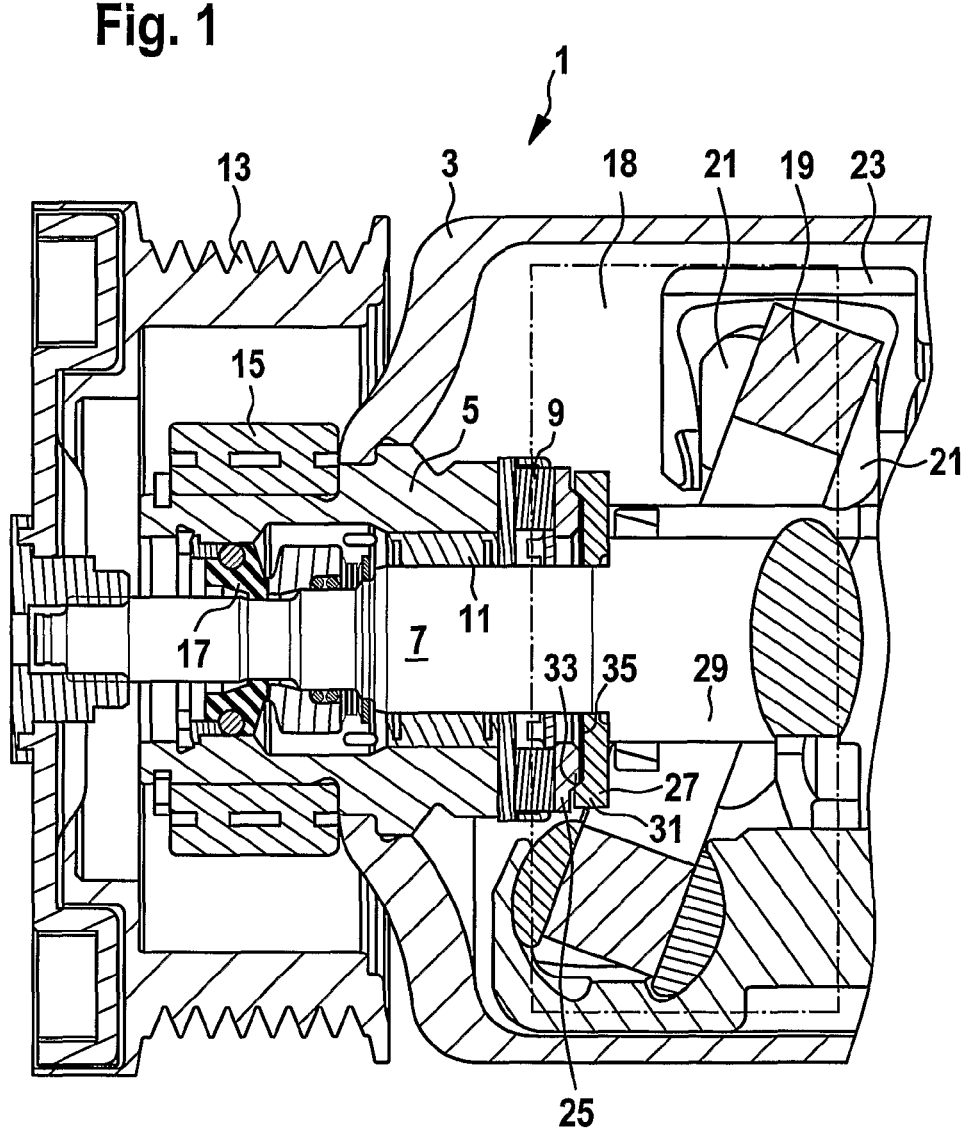
FIG. 1 shows part of an axial piston machine having the corresponding configuration of an axial bearing.

FIG. 1 shows part of an axial piston machine 1 in cross section. Inside a machine casing 3 a shaft 7 is supported by an axial bearing 9 and a radial bearing 11 in a bearing sleeve 5, which is situated in machine casing 3. Shaft 7 is driven via a belt pulley 13 in the belt drive of a combustion engine. Belt pulley 13 is also supported on bearing sleeve 5 by a separate roller bearing 15. The interior of the axial piston machine is sealed against the atmosphere by a mechanical seal 17. In drive chamber 18 of the machine, a tiltable drive ring 19 is set in rotary motion by shaft 7. On tiltable drive ring 19, piston shoes 21 in turn slide, which perform wobbling motions within reciprocating pistons 23 and thereby convert the rotary motion of shaft 7 into a reciprocating motion of pistons 23. Pistons 23 are supported inside a cylinder block, and inside cylinder liners situated therein, draw corresponding coolant in through valve devices, compress this coolant, and expel it again through appropriate valve devices. Important for the present invention are a first bearing washer 27 and a second bearing washer 25 in the area of axial bearing 9. Shaft 7 having an axial shaft collar 29 is supported axially on first washer 27. As defined herein, collar 29 and washer 27 define an articulated bearing support, which is a separate element from shaft 7 and bearing system 9. First washer 27 has an axially projecting conical rim 31, second washer 25 has a conically beveled edge 33. Conically projecting rim 31 of first washer 27 rests on conically beveled edge 33 of second washer 25 in such a way that contact only occurs between the two cones, and otherwise an intermediate space 35 is formed between the first and second washers. This has the advantage that when a rotating radial flexing of shaft 7 occurs, produced by the rotating forces of the axial piston drive mechanism, the first washer may shift its angle on the cone against second washer 25 due to tilting motions, and the axial forces of shaft 7 may be transmitted to bearing 9 through the contact surfaces between cones 31 and 33 in a flat pattern all around, despite the angular position. First washer 27 is thus able to perform a wobbling motion with respect to second washer 25.

Figure 2:
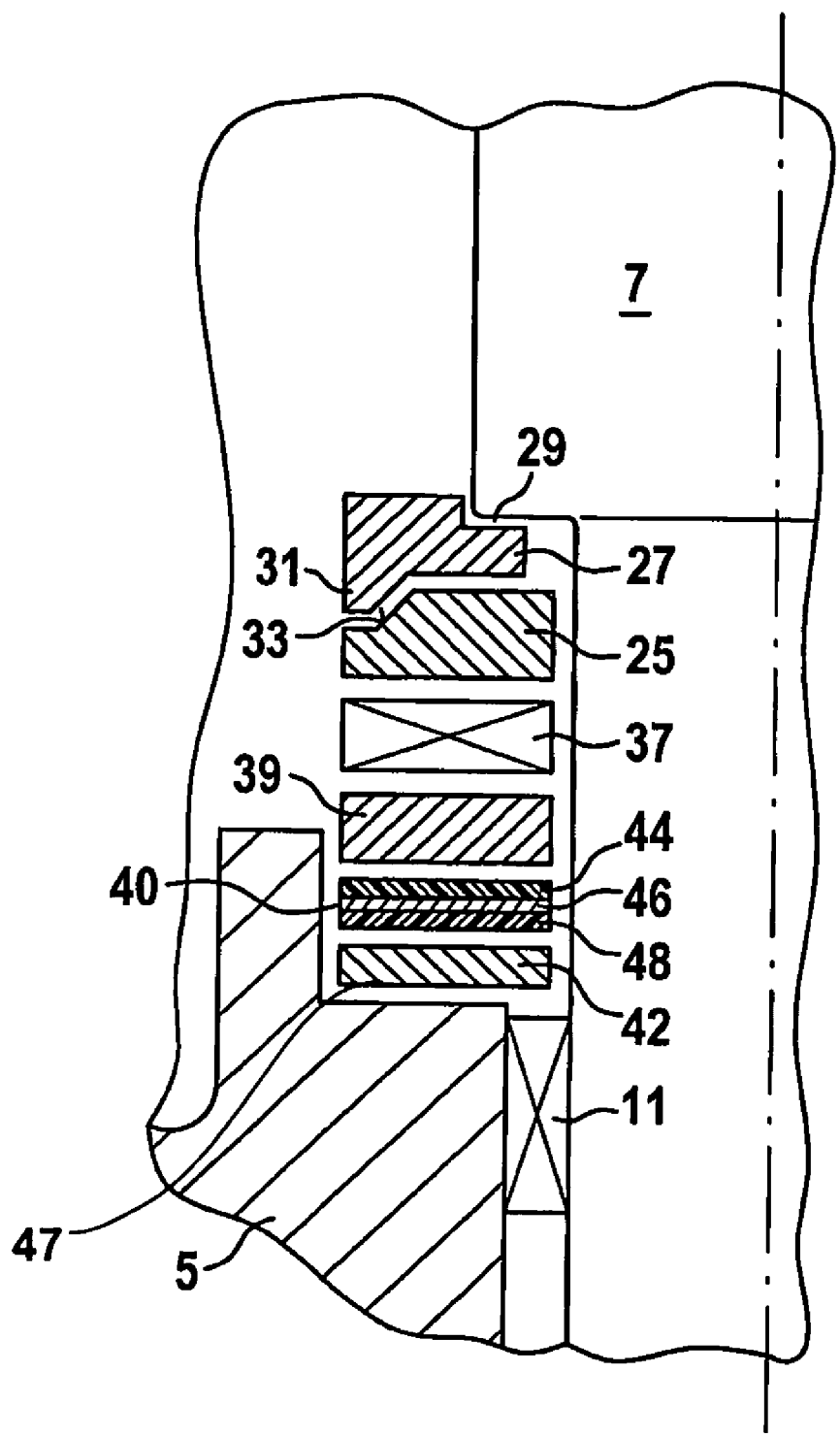
FIG. 2 shows the configuration of the axial bearing having a damping element according to the present invention.

FIG. 2 once again shows, in a cutaway view, the structure of the bearing arrangement, but here in addition with damping element 40. First washer 27 with conically projecting rim 31 and second washer 25 with conically beveled edge 33 are situated above rolling element 37 of axial bearing 9 from FIG. 1. Rolling element 37 continues to run on a lower bearing washer 39. A damping device in the form of a rubberized metal sheet 40 is now situated between lower bearing washer 39 and a support washer 42. Damping element 40 is made up here of an elastomer or rubber layer 44 which is vulcanized onto the top of a metal sheet substrate 46, and a second rubber layer 48 which is vulcanized onto the underside of metal sheet substrate 46.

Thus axial forces and axial vibrations that are fed into the bearing device by way of axial shaft collar 29 must penetrate firstly elastomer layer 44, secondly metal sheet layer 46 and thirdly second elastomer layer 48, before they are able to be transmitted through support washer 42 into the compressor casing or bearing sleeve 5 at a contact face 47 of bearing 9. The present invention therefore consists in damping element 40 being situated in the power flow between drive shaft 7 and machine casing 3 or bearing sleeve 5 in the area of axial bearing 9. Vibrations that occur are damped first simply by the two elastomer or rubber layers 44 and 48. The second damping effect comes about through the high impedance jump between rubber and metal (energy is consumed or used when a vibration passes from one material into the other). Rubberized metal sheet 40 has the advantage here of being able to utilize this effect repeatedly, since the first impedance jump occurs from metal bearing washer 39 to rubber layer 44, the second impedance jump from rubber layer 44 to metal sheet substrate 46, the third impedance jump from metal sheet substrate 46 to second rubber layer 48 and the fourth impedance jump from rubber layer 48 into support washer 42.

Because of the low construction height of these damping washers 40, the possibility also exists of a sandwich construction (damping washer 140, metal washer, again a damping washer 240, another metal washer, axial bearing, etc.). as shown in FIG. 3. This enables the damping effect to be increased still further. It is also possible to use rubber layers 144 and 148 in different thicknesses vulcanized to the top and underside of metal sheet substrate 146 respectively, as shown, in order to damp different frequencies.

The durability of this type of damping is achieved in particular through the fact that the axial force is transmitted from the shaft through a ring-shaped contact surface in a distributed manner because of the articulated axial bearing support achieved by the two washers 27 and 25. That prevents partial overloading of damping element 40, which would come about through a non-articulated bearing system.

REFERENCE NUMERALS 1 axial piston machine
3 machine casing
5 bearing sleeve
7 shaft
9 axial bearing
11 radial bearing
13 belt pulley
15 roller bearing for belt pulley
17 mechanical seal
18 drive chamber
19 tiltable drive ring
21 piston shoes
23 pistons
25 second bearing washer
27 first bearing washer
29 axial shaft collar
31 axially projecting conical rim
33 conically beveled edge
35 intermediate space between first and second washer
37 rolling element
39 lower bearing washer
40 rubberized metal sheet
42 support washer
44 elastomer layer
46 metal sheet substrate
48 second elastomer layer

What is claimed is:

1. An axial piston machine comprising:
a casing;
pistons;
a drive, the drive drawing in and compressing a pressurizing agent;
an axial bearing having a contact face in the casing;
a shaft, the shaft being supported by the axial bearing;
the drive being rotary driven by the shaft, the rotary motion of the shaft converted in the drive to a reciprocating motion of the pistons;
a damping element, including an elastomer-coated metal washer situated between a rolling element of the axial bearing and the contact face; and
an articulated bearing support between the shaft and axial bearing.

2. The axial piston machine as recited in claim 1 wherein the machine is an air-conditioning compressor for motor vehicles.

3. The axial piston machine as recited in claim 1 wherein the articulated bearing support has a first washer having an axially projecting conical rim and a second washer, having a conically beveled edge on the outer circumference, the axially projecting conical rim of the first washer bearing on the conically beveled edge of the second washer in such a way that contact between the first and the second washers occurs only between the two cones, and otherwise an axial intermediate space is formed between the first and second washers.

4. The axial piston machine as recited in claim 1 wherein the elastomer-coated metal washer is a rubberized metal sheet.

5. The axial piston machine as recited in claim 4 wherein the metal sheet is coated with rubber on both sides.

6. The axial piston machine as recited in claim 4 further comprising a second rubberized metal sheet washer situated in a sandwich construction with the rubberized metal sheet.

7. The axial piston machine as recited in claim 5 wherein the metal sheet is provided with different rubber coating thickness on each side of the metal sheet.

* * * * *

UNITED STATES PATENT AND TRADEMARK OFFICE
CERTIFICATE OF CORRECTION

PATENT NO. : 7,743,694 B2  Page 1 of 1
APPLICATION NO. : 11/791202
DATED : June 29, 2010
INVENTOR(S) : Uwe Becker It is certified that error appears in the above-identified patent and that said Letters Patent is hereby corrected as shown below:

Title Page item 73
Assignee name should read: Luk Fahrzeug-Hydraulik GmbH & Co. KG Claim 1 should read: An axial piston machine comprising:
    a casing;
    pistons;
    a drive, the drive causing the pistons to draw in and compress a pressurizing
        agent;
    an axial bearing having a contact face located within the casing;
    a shaft, the shaft being supported by the axial bearing;
    the drive being rotary driven by the shaft, the rotary motion of the shaft converted in
        the drive to a reciprocating motion of the pistons;
    a damping element, including an elastomer-coated metal washer situated between
        a rolling element of the axial bearing and the contact face; and
    an articulated bearing support between the shaft and axial bearing.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,743,694 B2 | Page 1 of 1 |
| APPLICATION NO. | : 11/791202 | |
| DATED | : June 29, 2010 | |
| INVENTOR(S) | : Uwe Becker | |

It is certified that error appears in the above-identified patent and that said Letters Patent is hereby corrected as shown below:

Title Page item 73
Assignee name should read: Luk Fahrzeug-Hydraulik GmbH & Co. KG Column 4, lines 25-39,
Claim 1 should read: An axial piston machine comprising:
    a casing;
    pistons;
    a drive, the drive causing the pistons to draw in and compress a pressurizing
        agent;
    an axial bearing having a contact face located within the casing;
    a shaft, the shaft being supported by the axial bearing;
    the drive being rotary driven by the shaft, the rotary motion of the shaft converted in
        the drive to a reciprocating motion of the pistons;
    a damping element, including an elastomer-coated metal washer situated between
        a rolling element of the axial bearing and the contact face; and
    an articulated bearing support between the shaft and axial bearing.

This certificate supersedes the Certificate of Correction issued November 30, 2010.

Signed and Sealed this
Twenty-fifth Day of January, 2011

David J. Kappos
*Director of the United States Patent and Trademark Office*